United States Patent
Haapala et al.

(10) Patent No.: US 10,964,345 B1
(45) Date of Patent: Mar. 30, 2021

(54) PARALLEL SERVO CONTROL IN A DATA STORAGE DEVICE

(71) Applicant: Seagate Technology LLC, Fremont, CA (US)

(72) Inventors: Kenneth Haapala, Plymouth, MN (US); Binh Kim Lieu, Campbell, CA (US); Evgeny Kharisov, Brooklyn, NY (US); Raye A. Sosseh, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/881,355

(22) Filed: May 22, 2020

(51) Int. Cl.
| G11B 5/56 | (2006.01) |
| G11B 5/60 | (2006.01) |
| G11B 20/10 | (2006.01) |
| G11B 20/18 | (2006.01) |
| G11B 20/12 | (2006.01) |
| G11B 5/55 | (2006.01) |

(52) U.S. Cl.
CPC .......... *G11B 5/6029* (2013.01); *G11B 5/6058* (2013.01); *G11B 20/10027* (2013.01); *G11B 20/1251* (2013.01); *G11B 20/18* (2013.01); *G11B 5/556* (2013.01); *G11B 5/5573* (2013.01)

(58) Field of Classification Search
None
See application file for complete search history.

(56) References Cited

U.S. PATENT DOCUMENTS

| 5,901,010 | A | 5/1999 | Glover et al. |
| 6,121,742 | A | 9/2000 | Misso |
| 6,327,120 | B1 | 12/2001 | Koganezawa et al. |
| 6,384,998 | B1 | 5/2002 | Price et al. |
| 6,449,130 | B1 | 9/2002 | Koyama |
| 6,515,834 | B1 * | 2/2003 | Murphy .............. G11B 5/5552 360/246.7 |
| 6,538,854 | B2 | 3/2003 | Koganezawa et al. |
| 6,542,326 | B1 | 4/2003 | Ell et al. |
| 6,614,627 | B1 * | 9/2003 | Shimizu .............. G11B 5/4833 360/294.4 |
| 6,693,760 | B1 | 2/2004 | Krounbi et al. |

(Continued)

FOREIGN PATENT DOCUMENTS

CN          100421154 C          9/2008

*Primary Examiner* — Tan X Dinh
(74) *Attorney, Agent, or Firm* — Westman, Champlin & Koehler, P.A.

(57) ABSTRACT

A data storage device includes a first data storage surface and a second data storage below the first data storage surface. The data storage device also includes a first micro-actuator coupled to a first arm that supports a first head over the first data storage surface, and a second micro-actuator coupled to a second arm that supports a second head over the second data storage surface. The data storage device further includes a coarse actuator, to which the first and second arms are coupled, that positions the first head and the second head between corresponding first and second tracks on the respective first and second data storage surfaces. Micro-actuator drive circuitry finely positions the first head over the first track and the second head over the second track by concurrently driving the first micro-actuator and the second micro-actuator in opposite directions.

20 Claims, 6 Drawing Sheets

(56) References Cited

U.S. PATENT DOCUMENTS

| | | | |
|---|---|---|---|
| 6,697,211 B2 * | 2/2004 | Koganezawa | G11B 5/5552 360/75 |
| 6,768,610 B1 | 7/2004 | Morris et al. | |
| 6,819,513 B2 | 11/2004 | Chainer et al. | |
| 6,914,746 B1 | 7/2005 | Meyer | |
| 8,482,873 B1 | 7/2013 | Chue et al. | |
| 8,797,689 B1 * | 8/2014 | Pan | G11B 5/4833 360/294.4 |
| 9,142,246 B1 | 9/2015 | Trantham et al. | |
| 9,311,940 B1 | 4/2016 | Kharisov et al. | |
| 9,361,919 B1 | 6/2016 | Lieu et al. | |
| 9,495,995 B1 | 11/2016 | Zhu et al. | |
| 9,875,759 B1 * | 1/2018 | Ee | G11B 5/4833 |
| 10,475,478 B2 | 11/2019 | Tagami | |
| 10,741,210 B1 * | 8/2020 | Hillukka | G11B 5/5521 |
| 2001/0038515 A1 | 11/2001 | Koganezawa et al. | |
| 2002/0057068 A1 * | 5/2002 | Ho | G11B 5/5552 318/560 |
| 2005/0152072 A1 * | 7/2005 | Kwon | G11B 5/56 360/294.4 |
| 2005/0168107 A1 * | 8/2005 | Hida | H01L 41/338 310/328 |
| 2007/0297084 A1 * | 12/2007 | Lee | G11B 5/54 360/75 |
| 2012/0250177 A1 | 10/2012 | Somanache et al. | |
| 2014/0139953 A1 * | 5/2014 | Hatch | G11B 5/483 360/234.5 |
| 2020/0286512 A1 * | 9/2020 | Hall | G11B 5/5569 |

\* cited by examiner

PARALLEL SERVO CONTROL IN A DATA STORAGE DEVICE

SUMMARY

In one embodiment, a data storage device is provided. The data storage device includes a first data storage surface and a second data storage below the first data storage surface. The data storage device also includes a first micro-actuator coupled to a first arm that supports a first head over the first data storage surface, and a second micro-actuator coupled to a second arm that supports a second head over the second data storage surface. The data storage device further includes a coarse actuator to which the first and second arms are coupled. The coarse actuator is configured to position the first head supported by the first arm and the second head supported by the second arm between corresponding first and second tracks on the respective first and second data storage surfaces. Micro-actuator drive circuitry finely positions the first head over the first track on the first data storage surface and the second head over the second track on the second data storage surface by concurrently driving the first micro-actuator coupled to the first arm and the second micro-actuator coupled to the second arm in opposite directions.

In another embodiment, a method is provided. The method includes providing a first data storage surface and a second data storage surface below the first data storage surface. The method also includes coarsely positioning a first head supported by a first arm and a second head supported by a second arm between corresponding first and second tracks on the respective first and second data storage surfaces. The method further includes finely positioning the first head over the first track on the first data storage surface and the second head over the second track on the second data storage surface by concurrently driving a first micro-actuator coupled to the first arm and a second micro-actuator coupled to the second arm in opposite directions.

In yet another embodiment, an apparatus is provided. The apparatus includes a first micro-actuator having a first and second connection poles, and a second micro-actuator having third and fourth connection poles. The third connection pole corresponds to the first connection pole of the first micro-actuator and the fourth connection pole corresponds to the second connection pole of the first micro-actuator. The apparatus also includes micro-actuator driver circuitry including a single power device having a first and second output terminals with the first output terminal connected to the first connection pole of the first micro-actuator and connected to the fourth connection pole of the second micro-actuator, and the second output terminal connected to the second connection pole of the first micro-actuator and connected to the third connection pole of the second micro-actuator. This connection configuration enables the first micro-actuator and the second micro-actuator to be driven in opposite directions by the single power device.

This summary is not intended to describe each disclosed embodiment or every implementation of parallel servo control in a data storage device as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1A:
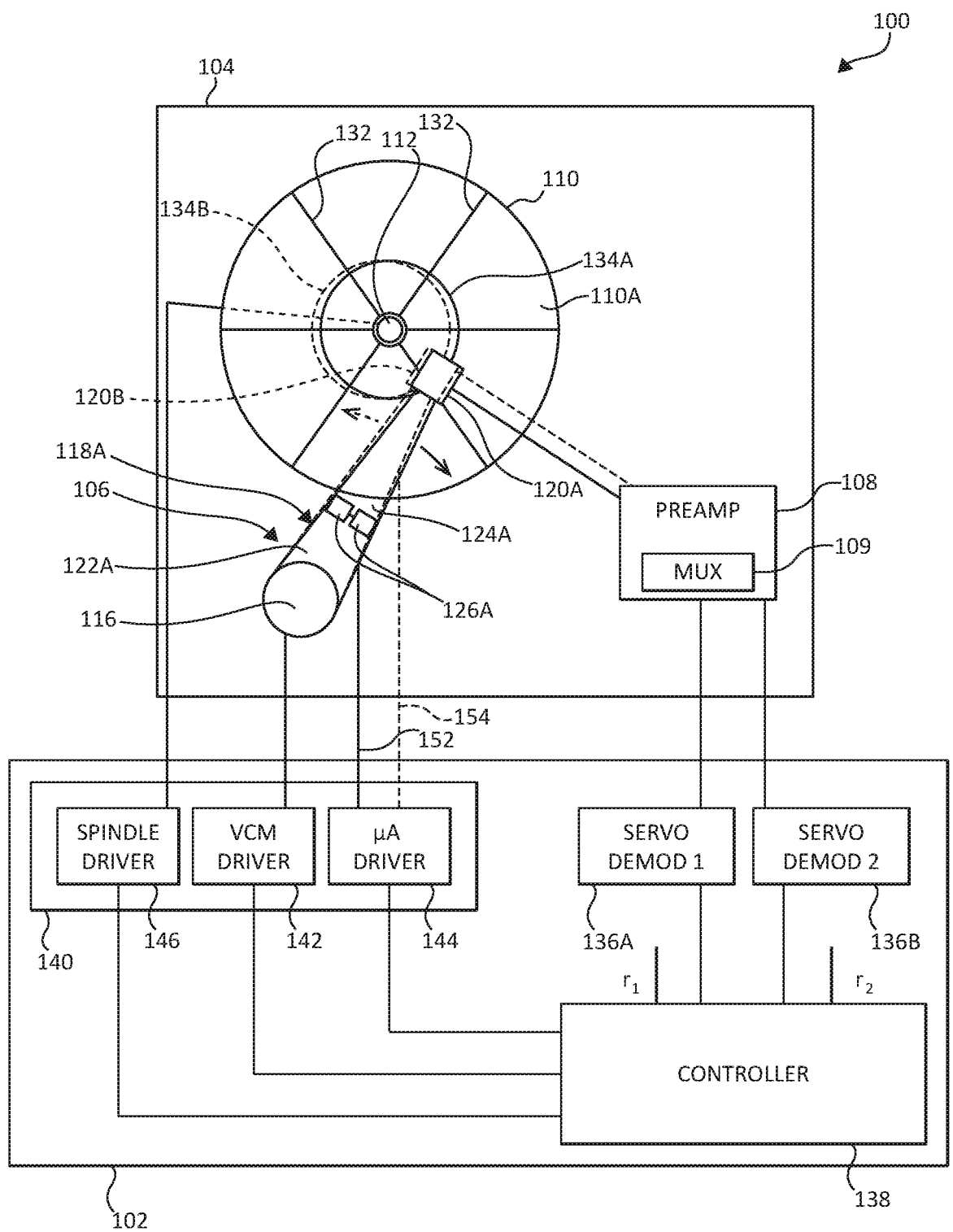
FIG. 1A is a diagrammatic illustration of a hard disc drive (HDD) that carries out servo tracking of multiple heads concurrently in accordance with one embodiment.

Embodiments of the disclosure generally relate to data storage devices (e.g., hard disc drives (HDDs)) that include servo control systems that carry out servo tracking of multiple heads (e.g., two read/write heads) concurrently.

Most HHDs include two or more heads (e.g., read/write heads) that are capable of reading data from surfaces of one or more magnetic discs. For example, if a drive includes a single disc, two heads may read from opposite sides of the disc. This can be extended to more than two discs, e.g., four heads reading from two discs. In traditional HDDs, one of the heads is usually used at a time, e.g., for reading from or writing to one of the disc surfaces. Control is switched from head-to-head depending on which disc surface is to be accessed to fulfill host requests.

As indicated above, embodiments of disclosure relate to HDDs that allow for two or more heads to operate in parallel or concurrently. This can, for example, increase data throughput by simultaneously reading from and/or writing with two more read/write heads that are located over different surfaces of one or more discs. In other applications, this may be used to improve reliability by writing and/or reading redundant data via each of the heads. The heads will generally be coupled to a common actuation structure, e.g., a multi-arm assembly that is commonly driven by a voice coil motor. A servo system controls the voice coil motor to position the heads. The servo control system may also individually control each of the heads to some extent, via micro-actuators associated with each head.

In some embodiments, the servo control system utilizes an out-of-phase driving scheme (e.g., a scheme that drives first and second micro-actuators associated with respective first and second heads located over different disc surfaces in opposite directions) to position the heads concurrently. One such embodiment is described below in connection with FIGS. 1A-1D.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Figure 1B:
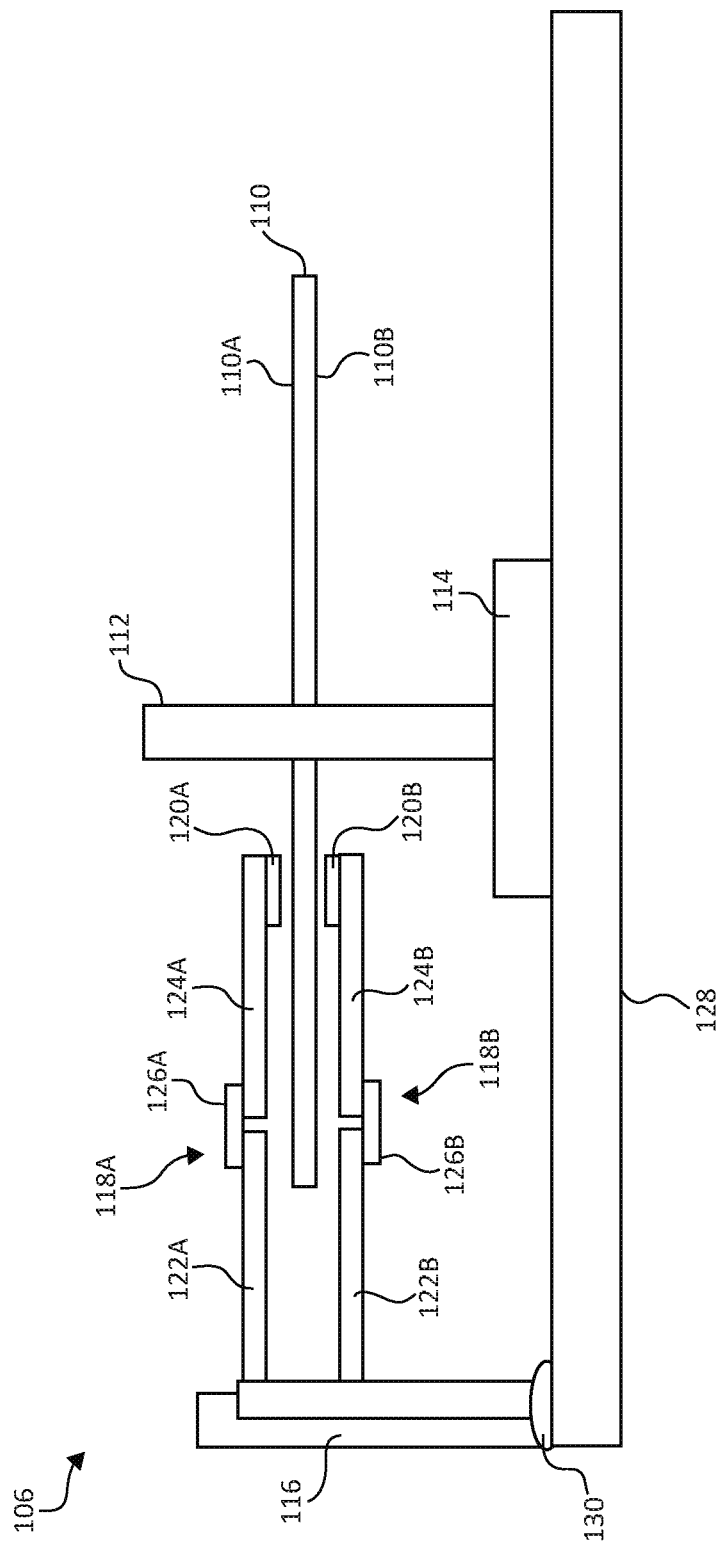
FIG. 1B is a side view of a head-disc assembly (HDA) portion of the HDD of FIG. 1A.

FIG. 1A is a diagrammatic illustration of a HDD 100 that carries out servo tracking of multiple read/write heads concurrently in accordance with one embodiment. FIG. 1B is a side view of a head-disc assembly (HDA) portion of HDD 100 of FIG. 1A. Referring to FIGS. 1A and 1B, HDD 100 includes a printed circuit board assembly (PCBA) 102 and a HDA 104. PCBA 102 includes circuitry and processors, which control elements of HDA 104 and also provide an interface controller for communicating between a host system (not shown) and HDA 104. Embodiments of the disclosure primarily relate to controlling elements within the HDA 104, and therefore elements of HDD 100 that manage and communicate data between the host system and the HDA 104 are not shown and described.

HDA 104 includes an actuator assembly 106, a preamplifier 108, and at least one disc 110. The disc 110 is mounted on a spindle 112. Spindle 112 is mechanically coupled to a spindle motor 114 (shown in FIG. 1B) for rotating the disc 110 at a high rate of speed.

Actuator assembly 106 may include a coarse actuator 116 that may be, for example, a motor, such as a voice coil motor (VCM), and top and bottom arms or arm assemblies 118A and 118B, respectively. Each of top and bottom actuator arm assemblies 118A, 118B includes, respectively, a first member 122A, 122B and a second member 124A, 124B. The first members 122A and 122B are coupled between a base 128 (shown in FIG. 1B) and their respective second members 124A and 124B, and the members 122A, 122B and 124A, 124B can provide two stages of movement. Interconnecting the respective first members 122A, 122B and the second members 124A, 124B are micro-actuators 126A, 126B. Transducers or heads 20A, 120B are mounted on distal portions of each of the second members 124A, 124B so that they can be positioned adjacent to a storage surfaces 110A, 110B of the disc 110. The transducers 120A, 120B may, for example, include at least one read element (e.g., a magneto resistive (MR) element) and, in some embodiments, may also include a write element.

The first members 122A, 122B of the actuator arm assemblies 118A, 118B may be interconnected to the base 128 by a bearing 130. Coarse actuator (e.g., VCM) 116 can pivot the actuator arm assemblies 118A and 118B together about bearing 130 to position the micro-actuators 126A and 126B and, thereby, position the transducers 120A and 120B with respect to the disc 110. In particular, the coarse actuator 116 positions the transducers 120A and 120B to allow them to access data tracks on the disc 110. Accordingly, the coarse actuator 116 can position the micro-actuator 126A and 126B and, thereby, the transducers 120A and 120B over a range of movement that may correspond to the distance between inner and outer data storage tracks of the storage surfaces 110A and 110B of the disc 110.

The articulation of the second members 124A, 124B with respect to their respective first members 122A, 122B of the actuator arm assemblies 118A, 118B may be achieved, for example, by providing journal bearings as part of the micro-actuators 126A, 126B. The articulation may also be achieved by providing a flexible interconnection between the respective second members 124A, 124B and first members 122A, 122B, or by otherwise joining the second members 124A, 124B to their respective first members 122A, 122B in such a way that the second members 124A, 124B are allowed to move with respect to their respective first members 122A, 122B.

The micro-actuators 126A, 126B are configured to position the transducers 120A, 120B relative to the disc 110 over a range of movement that is less than the range of movement provided by the coarse actuator 116. As such, the micro-actuator 126A, 126B may affect finer positioning and/or higher frequency movements of the transducers 120A, 120B within their range of movement (e.g., over relatively short distances), such as that which may be encountered during track following. In some embodiments, the second members 126A, 126B may be eliminated by directly connecting the transducers 120A, 120B to surfaces or extensions of the micro-actuators 126A, 126B. The micro-actuator 126A, 126B may be any mechanism capable of moving the transducers 120A, 120B relative to the disc 110 such as by adjusting the second members 124A, 124B of the actuator arm assemblies 118A, 118B with respect to their respective first members 122A, 122B. For example, the micro-actuators 126A, 126B may be piezoelectric (PZT) actuators, electromagnetic actuators or electrostatic actuators. In FIG. 1A, boxes 126A may be a pair of PZT micro-actuators. Similarly, micro-actuator 126B (not shown in FIG. 1A) may include a pair of PZT micro-actuators.

Disc surfaces 110A, 110B include servo wedges 132 having data (e.g., encoded patterns) that are used to detect the location of heads 120A, 120B relative to the disc surfaces 110A, 110B. Servo data read from servo wedges 132 by transducers or heads 120A, 120B is used by control circuitry described further below to move the heads 120A, 120B to addressed tracks 134A, 134B on the magnetic disc surfaces 110A, 110B in response to the read/write commands (seek mode). While data is being written to and/or read from the disc surfaces 110A, 110B, the servo data is also used to maintain the read/write heads 120A, 120B aligned with the track 134A, 134B (track following mode).

As noted above, in HDD 100, data is simultaneously read from corresponding tracks 134A, 134B on opposing disc surfaces 110A, 110B. For example, if each disc surface 110A, 110B includes 1000 tracks, which are numbered 0-999 on each surface 110A, 110B, then consider track 134A to be track 20 on surface 110A and track 134B to be track 20 on opposing disc surface 110B. Due to spindle 112 eccentricity, for example, tracks 132A and 132B may not be completely aligned, or may not completely overlap, as is seen in FIG. 1A. In embodiments of the disclosure, to simultaneously position heads 120A, 120B over tracks 134A, 134B, the actuator arm assemblies 118A, 118B are together moved by coarse actuator 116 such that heads 120A, 120B are positioned between tracks 134A, 134B. For example, coarse actuator (e.g., VCM) 116 positions actuator arm assemblies 118A, 118B, at an average of the two track 134A, 134B locations. Once coarsely positioned between tracks 134A, 134B, micro-actuators 126A, 126B are moved in opposite directions in the x-y plane by a single micro-actuator driver such that head 120A is positioned over track 134A and head 120B is positioned over track 134B. Details regarding components in HDA 104 and PCBA 102 that enable such micro-actuator 126A, 126B movement are provided below. A description of how read signals, control circuitry and drivers are employed to carry out the coarse and fine positioning of heads 120A and 120B are also described below. It should be noted that, in some embodiments, rather than selecting the same track number from surface 110A and 110B, different numbered tracks may be selected based on the "reach" or physical stroke limitations of the micro-actuators and/or any tracks per inch (TPI) differences between surfaces. Thus, in different embodiments, corresponding tracks over which heads 120A and 120B are substantially simultaneously positioned by micro-actuators 126A and 126B may also include different numbered tracks.

Preamplifier 108 within HDA 104 includes a multiplexer (mux) 109 that is configured such that readers of heads 120A and 12B are selected at the same time, and analog signals obtained from the readers are buffered and connected to multiple (e.g., two) servo demodulators 136A, 136B to obtain independent servo position information encoded in the servo patterns in wedges 132 on the disc 110. Outputs of the servo demodulators 136A, 136B are provided to a controller (e.g., a servo controller) 138. Controller 138 may be configured with a multi-input and multi-output (MIMO) control scheme that obtains the position information from the servo demodulators 136A, 136B, compares the position information with reference information/signals $r_1$ and $r_2$ to compute position error signals (PES) and, based at least in part on the PES, generates one or more output values, which are provided to driver circuitry 140. The output values provided by controller 138 may include a spindle motor driving current value, a VCM current value, and a micro-actuator (e.g., PZT) voltage value. The spindle motor driving current value is provided to spindle driver 142, which provides a current output to spindle motor 114 for rotating disc 100 at a substantially constant high rate of speed. The VCM current value is provided to VCM driver 144, which, upon receiving the VCM current value, provides a corresponding VCM current that suitably adjusts a position of VCM 116 (e.g., between tracks 134A and 134B). The micro-actuator voltage value is provided to micro-actuator (e.g., PZT) driver 146, which responsively provides a single voltage output corresponding to the received voltage value via output terminals 152 and 154. The single voltage output from micro-actuator driver 146 simultaneously derives micro-actuators 126A, 126B in opposite directions. One circuit connection configuration that can simultaneously drive the micro-actuators 126A, 126B in opposite directions with a single voltage output is described below in connection with FIG. 1C.

Figure 1C:
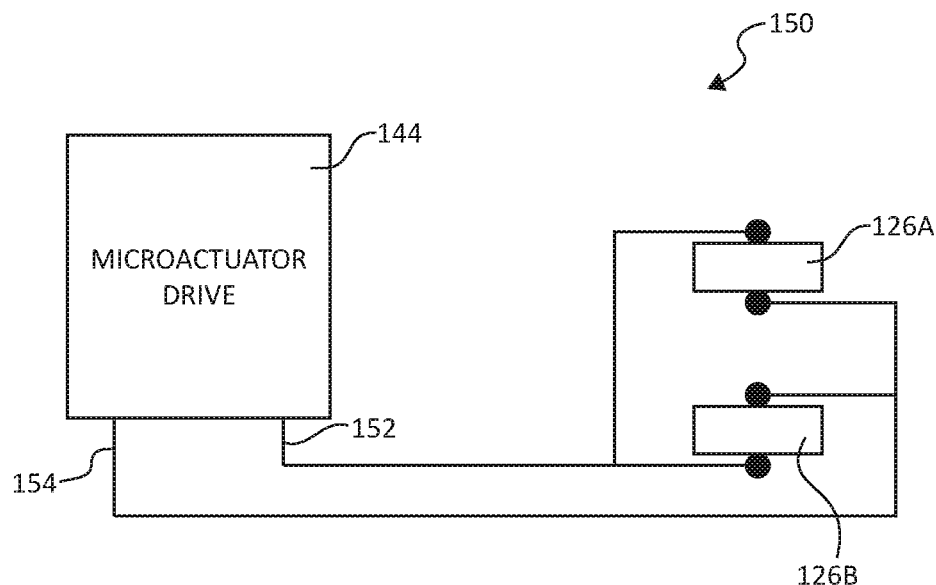
FIG. 1C illustrates a micro-actuator driver circuit configuration for driving actuators in opposite directions from a same source.

FIG. 1C illustrates a micro-actuator driver circuit configuration 150 for driving actuators 126A and 126B in opposite directions from a same power device. In some embodiments, the micro-actuator driver circuit includes one or more operational trans-conductance amplifiers controlling a single-ended or differential output voltage, herein referred to as a voltage source. The one or more trans-conductance amplifiers provide one single-ended voltage output or one differential voltage output and therefore constitute a single or common source. In circuit 150, micro-actuator driver 144 includes the voltage source, which has a first voltage supply terminal (e.g., a positive supply terminal) 152 and a second voltage supply terminal (e.g., a negative supply terminal) 154. As can be seen in FIG. 1C, first and second voltage supply terminals 152 and 154 are oppositely connected to micro-actuators 126A and 126B, respectively. For example, first voltage supply terminal 152 is connected to a positive pole of micro-actuator 126A and connected to a negative pole of micro-actuator 126B, and second voltage supply terminal 154 is connected to a positive pole of micro-actuator 126B and connected to a negative pole of micro-actuator 126A. It should be noted that, if each micro-actuator 126A, 126B includes a pair of PZT micro-actuators as shown in FIG. 1A, then one PZT micro-actuator includes the positive connector or pole and the other PZT micro-actuator includes the negative connector or pole. In general, independently of the type of micro-actuator used, micro-actuator driver circuit configuration 150 enables the utilization of a single voltage source to concurrently drive micro-actuators 126A, 126B in opposite directions for track following operations.

Figure 1D:
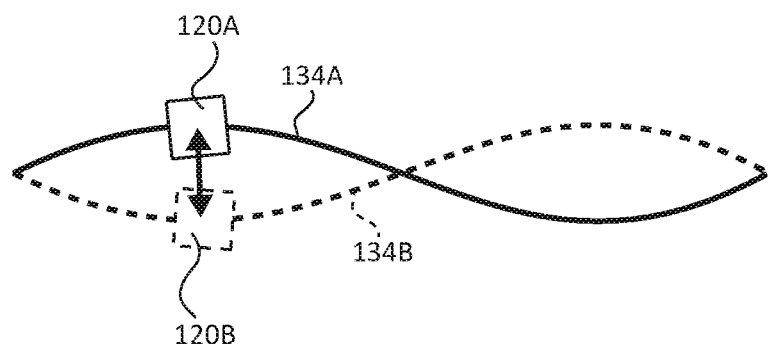
FIG. 1D is a diagrammatic illustration of sinusoidal position skew between tracks.

FIG. 1D is a diagrammatic illustration of sinusoidal position skew between tracks 134A and 134B over one disc revolution assuming a single harmonic. As can be seen in FIG. 1D, heads 120A and 120B are moved in opposite directions to follow the tracks. It should be noted that a single harmonic is a simple example, and any number of harmonics or frequencies may be present.

Elements for servo tracking of multiple read/write heads described above in connection with FIGS. 1A-1D may be modified for use in different types of HDDs. For example, some current HDDs utilize multiple sensor magnetic recording (MSMR), also known as two-dimensional magnetic recording (TDMR), where two physical readers are present on each head. For MSMR, a preamplifier amplifies the read signals from two readers concurrently and transmits the analog signals over two differential signal paths routed on a printed circuit card assembly (PCCA). These are in turn routed through a connector and on a PCBA to a system on chip (SoC) containing two analog front ends, a read channel and two servo demodulators. Embodiments of the disclosure utilize an analog switch (mux) in a MSMR preamp that allows for the selection of one reader from each of two heads (e.g., two heads on opposite sides of the same disc) simultaneously. In addition, two servo demodulators in the SoC allow for concurrent processing of read data from two heads. One such embodiment is described below in connection with FIG. 2.

Figure 2:
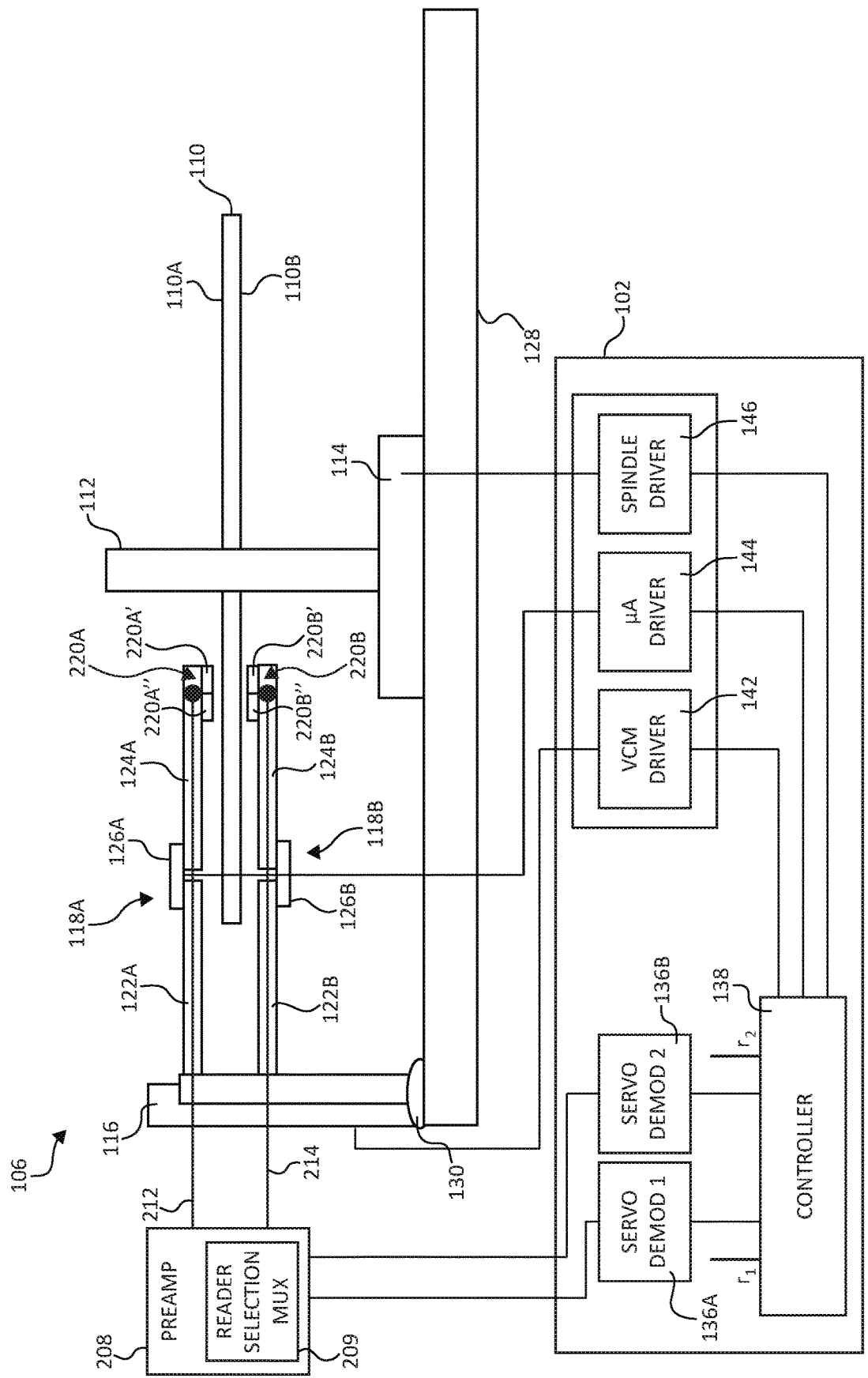
FIG. 2 is a diagrammatic illustration of a HDD that utilizes multiple sensor magnetic recording (MSMR) and carries out servo tracking of multiple heads concurrently in accordance with one embodiment.

FIG. 2 is a diagrammatic illustration of a HDD 200 that utilizes MSMR and carries out servo tracking of multiple read/write heads concurrently in accordance with one embodiment. To avoid repetition, descriptions of elements of HDD 200 that are similar to the elements of HDD 100 (of FIG. 1A) are not provided in connection with FIG. 2. In HDD 200, for MSMR, first head 220A includes a first reader 220A' and a second reader 220A", and second head 220B includes a first reader 220B' and a second reader 220B". In the interest of simplification, any writers that may be included in heads 220A and 220B are not shown and described.

As can be seen in FIG. 2, HDD 200 includes a preamplifier 208 that is electrically coupled to heads 220A and 220B. Preamplifier 208 is configured to amplify signals obtained from readers 220A', 220A", 220B' and 220B".

Preamplifier 208 includes a multiplexer (mux) 209 that receives signals from readers 220A', 220A", 220B' and 220B" via input lines 212 and 214 and may provide four different signal selection choices as outputs. A first signal selection output may be signals from readers 220A' and 220A", a second signal selection output may be signals from readers 220B' and 220B", a third signal selection output may be signals from readers 220A' and 220B', and a fourth signal selection output may be signals from readers 220A" and 220B". The third or fourth signal selection outputs may be used for servo tracking of heads 220A and 220B concurrently since read signals from readers (e.g., 220A' and 220B') on both heads 220A and 220B are output by mux 209 simultaneously. Once the signals from readers 220A' and 220B' (or from readers 220A" and 220B") are obtained, concurrent servo tracking is carried out in a manner described above in connection with FIGS. 1A-1D. Therefore, in the interest of brevity, the description related to servo tracking is not repeated. It should be noted that, although the above-described embodiments describe opposing surfaces of a same disc, alternate embodiments of the micro-actuator out-of-phase driving scheme may concurrently position heads over surfaces of different discs.

Figure 3A:
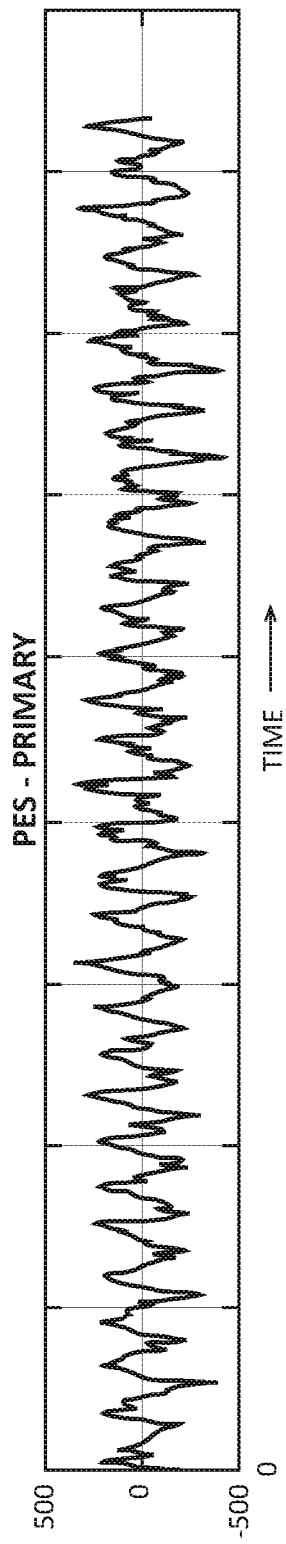
FIGS. 3A-3D are graphs of various quantities obtained during operation of a HDD that employs a micro-actuator out-of-phase driving scheme to position first and second heads concurrently.
Figure 3B:
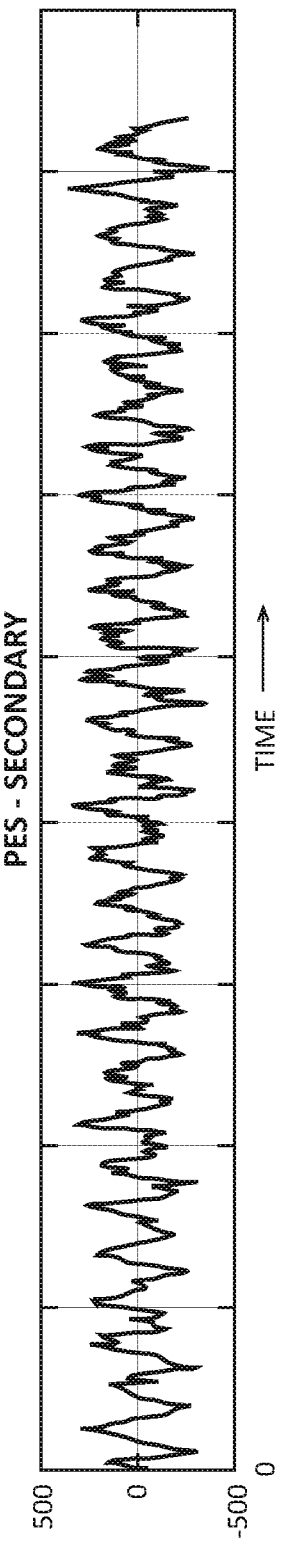
Figure 3C:
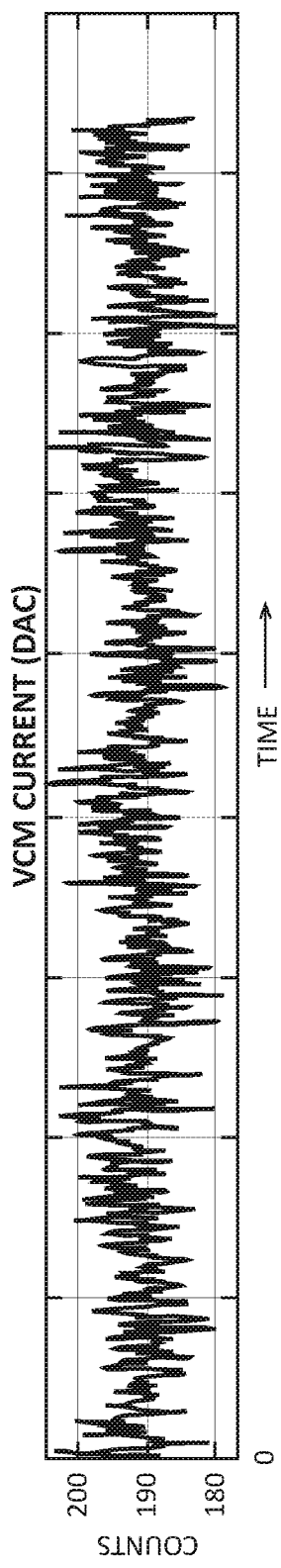
Figure 3D:
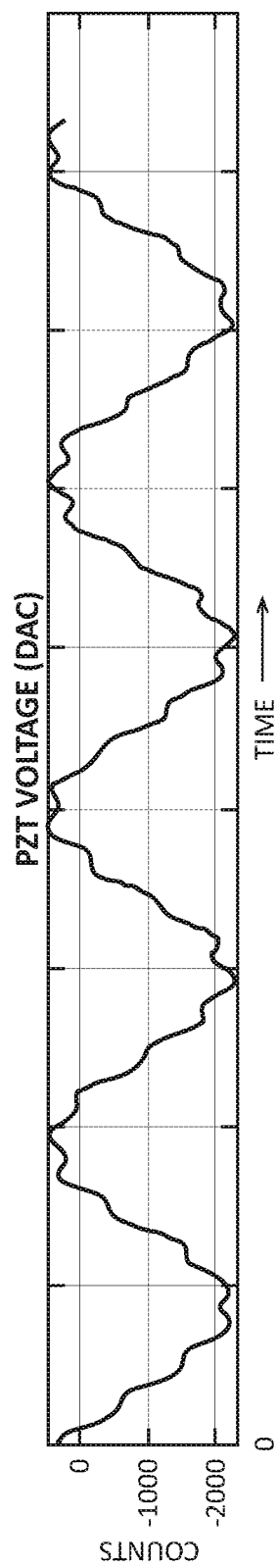

FIGS. 3A-3D are graphs of various quantities obtained during operation of a HDD that employs a micro-actuator out-of-phase driving scheme to position first and second heads concurrently. FIG. 3A is a PES plot for the first head, and FIG. 3B is a PES plot of the second head. FIG. 3C is a plot of VCM current, and FIG. 3D is a plot of PZT voltage. The plots in FIGS. 3A-3D demonstrate that track following operations may be carried for two heads concurrently in a HDD that employs the micro-actuator out-of-phase driving scheme described above.

The micro-actuator out-of-phase driving scheme has various advantages, some of which are included below:
1) It enables a reduction in HDD test time in the factory process due to collecting servo field data while positioning on two heads concurrently during various calibrations and certification testing.
2) There is no additional product bill of materials cost to implement the features in a HDD other than utilizing existing MSMR electronics along with the appropriate multiplexing available in the preamplifiers and the PZTs wired out-of-phase. A majority of the features would reside in a downloadable firmware release, which includes modifications for configuring the analog read signal multiplexing, concurrent position demodulation, and MIMO control algorithms.
3) The solution could be extended further to double the sequential read data rate by operating two heads in parallel provided that read channel architecture can handle multiple read data streams.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

What is claimed is:

1. A data storage device comprising:
a first data storage surface;
a second data storage surface below the first data storage surface;
a first micro-actuator coupled to a first arm that supports a first head over the first data storage surface;
a second micro-actuator coupled to a second arm that supports a second head over the second data storage surface;
a coarse actuator, to which the first and second arms are coupled, configured to position the first head supported by the first arm and the second head supported by the second arm between corresponding first and second tracks on the respective first and second data storage surfaces; and
micro-actuator drive circuitry configured to finely position the first head over the first track on the first data storage surface and the second head over the second track on the second data storage surface by concurrently driving the first micro-actuator coupled to the first arm and the second micro-actuator coupled to the second arm in opposite directions when the first and second arms are coupled to the coarse actuator.

2. The data storage device of claim 1 and wherein:
the first micro-actuator comprises first and second connection poles;
the second micro-actuator comprises third and fourth connection poles, the third connection pole corresponds to the first connection pole of the first micro-actuator and the fourth connection pole corresponds to the second connection pole of the first micro-actuator; and
the micro-actuator driver circuitry comprises a single power device having first and second output terminals, with the first output terminal connected to the first connection pole of the first micro-actuator and connected to the fourth connection pole of the second micro-actuator, and the second output terminal connected to the second connection pole of the first micro-actuator and connected to the third connection pole of the second micro-actuator, thereby enabling the first micro-actuator and the second micro-actuator to be driven in opposite directions by the single power device.

3. The data storage of claim 1 and further comprising a preamplifier coupled to the first and second heads and configured to amplify a first readback signal from the first head and a second readback signal from the second head.

4. The data storage device of claim 3 and wherein the preamplifier further comprises a multiplexer configured to select both the first readback signal from the first head and the second readback signal from the second head.

5. The data storage device of claim 4 and wherein the first readback signal is a selected one of a plurality of readback signals from a plurality of readers of the first head, and wherein the second readback signal is a selected one of a plurality of readback signals from a plurality of readers of the second head.

6. The data storage device of claim 3 and further comprising:
a first servo demodulator configured to extract first servo position information from the first readback signal; and
a second servo demodulator configured to extract second servo position information from the second readback signal.

7. The data storage device of claim 6 and further comprising a controller configured to:
receive the first servo position information from the first servo demodulator and compute a first position error signal (PES) as a function of the first servo position information and a first reference signal;
receive the second servo position information from the second servo demodulator and compute a second PES as a function of the second servo position information and a second reference signal;
provide a first control value to the coarse actuator; and
provide a second control value to the micro-actuator drive circuitry.

8. The data storage device of claim 7 and wherein the coarse actuator is configured to adjust a position of the first and second arms in response to receiving the first control value from the controller.

9. The data storage device of claim 7 and wherein the micro-actuator drive circuitry is configured to concurrently drive the first micro-actuator coupled to the first arm and the second micro-actuator coupled to the second arm in opposite directions based on the second control value.

10. A method comprising:
providing a first data storage surface;
providing a second data storage surface below the first data storage surface;
coarsely positioning, by a coarse actuator, a first head supported by a first arm and a second head supported by a second arm between corresponding first and second tracks on the respective first and second data storage surfaces; and
finely positioning the first head over the first track on the first data storage surface and the second head over the second track on the second data storage surface by concurrently driving a first micro-actuator coupled to the first arm and a second micro-actuator coupled to the second arm in opposite directions when the first and second arms are coupled to the coarse actuator.

11. The method of claim 10 and further comprising employing a single source to concurrently drive both the first micro-actuator and the second micro-actuator.

12. The method of claim 10 and wherein the coarse positioning and the fine positioning of the first head and the second heard are carried out according to servo information read from the first and second data storage surfaces by the respective first and second heads.

13. An apparatus comprising:
a first micro-actuator having first and second connection poles;
a second micro-actuator having third and fourth connection poles, the third connection pole corresponding to the first connection pole of the first micro-actuator and the fourth connection pole corresponding to the second connection pole of the first micro-actuator; and
micro-actuator driver circuitry comprising a single power device having a first and second output terminals with the first output terminal connected to the first connection pole of the first micro-actuator and connected to the fourth connection pole of the second micro-actuator, and the second output terminal connected to the second connection pole of the first micro-actuator and connected to the third connection pole of the second micro-actuator, thereby enabling the first micro-actuator and the second micro-actuator to be driven in opposite directions by the single power device.

14. The apparatus of claim 13 and further comprising:
a first data storage surface;
a second data storage surface below the first data storage surface;
the first micro-actuator coupled to a first arm that supports a first head over the first data storage surface;
the second micro-actuator coupled to a second arm that supports a second head over the second data storage surface;
a coarse actuator, to which the first and second arms are coupled, configured to position the first head supported by the first arm and the second head supported by the second arm between corresponding first and second tracks on the respective first and second data storage surfaces; and
the micro-actuator drive circuitry configured to finely position the first head over the first track on the first data storage surface and the second head over the second track on the second data storage surface by concurrently driving the first micro-actuator coupled to the first arm and the second micro-actuator coupled to the second arm in opposite directions.

15. The apparatus of claim 14 and further comprising a preamplifier coupled to the first and second heads and configured to amplify a first readback signal from the first head and a second readback signal from the second head.

16. The apparatus of claim 15 and wherein the preamplifier further comprises a multiplexer configured to select both the first readback signal from the first head and the second readback signal from the second head.

17. The apparatus of claim 16 and wherein the first readback signal is a selected one of a plurality of readback signals from a plurality of readers of the first head, and wherein the second readback signal is a selected one of a plurality of readback signals from a plurality of readers of the second head.

18. The apparatus of claim 16 and further comprising:
a first servo demodulator configured to extract first servo position information from the first readback signal; and a second servo demodulator configured to extract second servo position information from the second readback signal.

19. The data storage device of claim 18 and further comprising a controller configured to:
    receive the first servo position information from the first servo demodulator and compute a first position error signal (PES) as a function of the first servo position information and a first reference signal;
    receive the second servo position information from the second servo demodulator and compute a second PES as a function of the second servo position information and a second reference signal;
    provide a first control value to the coarse actuator; and
    provide a second control value to the micro-actuator drive circuitry.

20. The data storage device of claim 19 and wherein at least one of:
    the coarse actuator is configured to adjust a position of the first and second arms in response to receiving the first control value from the controller; or
    the micro-actuator drive circuitry configured to concurrently drive the first micro-actuator coupled to the first arm and the second micro-actuator coupled to the second arm in opposite directions based on the second control value.

* * * * *